United States Patent
Okazaki

(10) Patent No.: US 8,728,607 B2
(45) Date of Patent: May 20, 2014

(54) CERAMIC HONEYCOMB STRUCTURE AND ITS PRODUCTION METHOD

(75) Inventor: Shunji Okazaki, Yukuhashi (JP)

(73) Assignee: Hitachi Metals, Ltd., Tokyo (JP)

( * ) Notice: Subject to any disclaimer, the term of this patent is extended or adjusted under 35 U.S.C. 154(b) by 923 days.

(21) Appl. No.: 12/520,912

(22) PCT Filed: Dec. 25, 2007

(86) PCT No.: PCT/JP2007/074849
§ 371 (c)(1),
(2), (4) Date: Jul. 23, 2009

(87) PCT Pub. No.: WO2008/078748
PCT Pub. Date: Jul. 3, 2008

(65) Prior Publication Data
US 2010/0009117 A1    Jan. 14, 2010

(30) Foreign Application Priority Data
Dec. 27, 2006   (JP) ................................ 2006-351700

(51) Int. Cl.
| | | |
|---|---|---|
| *B01D 46/24* | (2006.01) | |
| *C04B 35/195* | (2006.01) | |
| *C04B 41/50* | (2006.01) | |
| *F01N 3/022* | (2006.01) | |
| *C04B 41/00* | (2006.01) | |
| *C04B 41/85* | (2006.01) | |
| *F01N 3/28* | (2006.01) | |
| *C04B 111/00* | (2006.01) | |

(52) U.S. Cl.
CPC ........ *B01D 46/2444* (2013.01); *B01D 46/2462* (2013.01); *C04B 35/195* (2013.01); *C04B 41/009* (2013.01); *C04B 41/5089* (2013.01); *C04B 41/5035* (2013.01); *C04B 41/85* (2013.01); *F01N 3/2828* (2013.01); *B01D 46/2425* (2013.01); *B01D 46/2451* (2013.01); *C04B 2111/00793* (2013.01); *C04B 2111/0081* (2013.01); *F01N 2330/30* (2013.01)
USPC ........................ 428/116; 427/397.7; 502/439

(58) Field of Classification Search
CPC ........... B01D 46/2462; B01D 46/2444; B01D 46/2425; C04B 35/195; C04B 41/009; C04B 41/5089; C04B 41/5035; C04B 41/85; F01N 3/2828
USPC .................................................. 428/116–118
See application file for complete search history.

(56) References Cited

U.S. PATENT DOCUMENTS

| | | | | |
|---|---|---|---|---|
| 5,629,067 | A * | 5/1997 | Kotani et al. ................. | 428/116 |
| 2003/0032545 | A1* | 2/2003 | DiChiara, Jr. .................. | 501/87 |

(Continued)

FOREIGN PATENT DOCUMENTS

| | | | |
|---|---|---|---|
| JP | 03107518 | A * | 5/1991 |
| JP | 05-269388 | A | 10/1993 |

(Continued)

*Primary Examiner* — David Sample
*Assistant Examiner* — Nicholas W Jordan
(74) *Attorney, Agent, or Firm* — Sughrue Mion, PLLC

(57) ABSTRACT

A ceramic honeycomb structure comprising a ceramic honeycomb body having cell walls defined by a large number of longitudinally extending cells, and an outer peripheral wall formed on an outer peripheral surface of the ceramic honeycomb body, the outer peripheral wall being formed by coating longitudinally extending grooves defined by cell walls on the outer peripheral surface of the ceramic honeycomb body with a coating material, and the outer peripheral wall having higher hardness in its outer peripheral portion than in its inside portion in a thickness direction.

3 Claims, 1 Drawing Sheet

(56) References Cited

U.S. PATENT DOCUMENTS

2006/0105139 A1* 5/2006 Suwabe et al. ............... 428/116
2006/0216466 A1* 9/2006 Yoshida ....................... 428/116
2008/0124516 A1* 5/2008 Noguchi et al. .............. 428/117

FOREIGN PATENT DOCUMENTS

| JP | 2004-075524 A | 3/2004 |
| JP | 2004-175654 A | 6/2004 |
| JP | 2006-255542 A | 9/2006 |

* cited by examiner

CERAMIC HONEYCOMB STRUCTURE AND ITS PRODUCTION METHOD

CROSS REFERENCE TO RELATED APPLICATION

This application is a National Stage of International Application No. PCT/JP 2007/074849 filed Dec. 25, 2007, claiming priority based on Japanese Patent Application No. 2006-351700, filed Dec. 27, 2006, the contents of all of which are incorporated herein by reference in their entirety.

FIELD OF THE INVENTION

The present invention relates to a ceramic honeycomb structure and its production method, particularly to a honeycomb structure having an outer peripheral wall formed by a coating material applied to a peripheral portion appearing by removing a peripheral wall portion from a ceramic honeycomb by machining, and its production method.

BACKGROUND OF THE INVENTION

To protect regional or global environment, harmful materials are removed from exhaust gases emitted from engines of automobiles, etc., using exhaust-gas-cleaning catalyst converters and particulate-matter-capturing ceramic honeycomb filters comprising ceramic honeycomb structures, which may be called "honeycomb structures."

As shown in FIG. 2, a honeycomb structure 20 usually comprises an outer peripheral wall 21, and perpendicular cell walls 23 formed inside this outer peripheral wall 21 for defining a large number of cells 24. When used, such honeycomb structure 20 is placed in a metal container (not shown) with its outer peripheral wall 21 strongly gripped by holding members disposed on an inner surface of the container.

A cordierite honeycomb structure 20, for instance, is conventionally produced by the following steps. Cordierite-forming material powder, a molding aid, a pore former and water are first blended to form a moldable ceramic material, which is extruded from a die to provide a honeycomb molding integrally having an outer peripheral wall 21 and cell walls 23. This molding is placed in a drying furnace to evaporate water from the molding, and then placed in a sintering furnace to remove the molding aid, etc. It is then sintered to obtain a honeycomb structure 20 having fine pores in cell walls 23 with predetermined shape and strength.

For instance, when a large ceramic honeycomb filter for diesel engines, which has an outer diameter D of 150 mm or more and a length L of 150 mm or more in FIG. 2, is produced, there are such problems that when a honeycomb structure is formed from a moldable material by extrusion molding, its cell walls 23 near an outer peripheral wall 21 are deformed by its own weight, and that the honeycomb structure does not have sufficient strength after sintering.

To solve such problems, JP 2004-75524 A discloses a honeycomb structure having an outer peripheral wall obtained by removing a peripheral wall portion from a honeycomb body, and coating the resultant outer peripheral surface with a coating material comprising 100 parts by weight of ceramic powder comprising cordierite particles and/or ceramic fibers, and 3-35 parts by weight of an inorganic binder of colloidal silica or alumina. JP 2004-75524 A describes that this coating material provides the outer peripheral wall with improved peeling resistance, resulting in a honeycomb structure having excellent heat resistance and heat shock resistance. However, in the outer peripheral wall of the honeycomb structure described in JP 2004-75524 A, the migration of colloidal silica or alumina toward outer periphery is suppressed. As a result, the honeycomb structure has high strength not only on outer periphery but also inside, less absorbing heat shock applied to the cell walls, thus providing the outer peripheral wall with insufficient heat shock resistance.

JP 2006-255542 A discloses a honeycomb structure having an outer peripheral wall formed by a coating material comprising ceramic particles having an average particle size of 20-50 µm, which is provided with a dense surface layer as thick as 1-50 µm or an impregnated dense layer as thick as 10-300 µm by applying a coating agent comprising colloidal ceramics such as colloidal silica or alumina, etc. as main components to the outermost surface of the outer peripheral wall. JP 2006-255542 A describes that in a honeycomb structure having such dense surface layer or impregnated dense layer, the outer peripheral wall has smaller porosity on surface than in a center portion, resulting in less detachment of ceramic particles forming the outer peripheral wall, and excellent durability and wear resistance. However, because the outer peripheral wall of the honeycomb structure described in JP 2006-255542 A does not contain a binder, water in the coated material comprising ceramic particles having an average particle size of 20-50 µm is easily absorbed by the honeycomb structure, resulting in densification in the inner side of the outer peripheral wall. As a result, the outer peripheral wall has high strength on the inner side, so that heat shock applied to the cell walls is less relaxed, resulting in low heat shock resistance.

JP 5-269388 A discloses a method for producing a ceramic honeycomb structure by forming its outer peripheral wall with a coating material comprising 100 parts by weight of cordierite particles and/or ceramic fibers and 3-35 parts by weight of colloidal oxide as main components. It is described that this method can form an outer peripheral wall having heat shock resistance, strength and reliability on the ceramic honeycomb structure, while preventing the cracking of the outer peripheral wall that would occur in a drying step. However, because the outer peripheral wall of the honeycomb structure described in JP 5-269388 A is left to stand for 24 hours in the air for drying, the colloidal oxide does not move toward outside in the outer peripheral wall, so that the outer peripheral wall has high strength in both outside and inside. Accordingly, heat shock applied to cell walls is less relaxed, providing the outer peripheral wall with insufficient heat shock resistance.

Further, because large, heavy honeycomb structures having outer diameters of 150 mm or more and lengths of 150 mm or more for use in ceramic honeycomb filters for diesel engines are easily influenced by engine vibration and vibration due to contact with road surfaces, the outer peripheral walls described in JP 2004-75524 A, JP 2006-255542 A and JP 5-269388 A are insufficient in hardness, being likely to damaged during use. Particularly, ceramic honeycomb filters for diesel engines used in construction machines, etc. are subjected to very large vibration and shock during use, so that their outer peripheral walls are likely damaged. If the outer peripheral walls are made thicker to have higher hardness to prevent damage, they are easily cracked due to heat shock, resulting in low heat shock resistance.

OBJECT OF THE INVENTION

Accordingly, an object of the present invention is to provide a ceramic honeycomb structure comprising a ceramic honeycomb body having cell walls defining a large number of longitudinally extending cells, and an outer peripheral wall formed on an outer peripheral surface of the ceramic honeycomb body, the outer peripheral wall having such high hardness and heat shock resistance that it is not damaged even under very large vibration or shock, and its production method.

DISCLOSURE OF THE INVENTION

As a result of intense research in view of the above object, the inventors have found that with hardness properly changing in its thickness direction, the outer peripheral wall of the honeycomb structure can have well-balanced hardness and heat shock resistance. The present invention has been completed based on such finding.

Thus, the ceramic honeycomb structure of the present invention comprises a ceramic honeycomb body having cell walls defining a large number of longitudinally extending cells, and an outer peripheral wall formed on an outer peripheral surface of the ceramic honeycomb body, the outer peripheral wall being formed by coating longitudinally extending grooves defined by cell walls on the outer peripheral surface of the ceramic honeycomb body with a coating material, and the outer peripheral wall having higher hardness in its outer peripheral portion than in its inside portion in a thickness direction.

The B-type durometer hardness (ASTM D2240) of the outer peripheral wall is preferably 90-95 in the outer peripheral portion, and 85-90 in the inside portion, and it more preferably decreases gradually from the outer peripheral portion to the inside portion.

In the ceramic honeycomb structure of the present invention, the outer peripheral wall is preferably as thick as 0.5-5 mm. The method of the present invention for producing a ceramic honeycomb structure comprising a ceramic honeycomb body having cell walls defining a large number of longitudinally extending cells and an outer peripheral wall formed on an outer peripheral surface of the ceramic honeycomb body, comprises forming the outer peripheral wall by coating longitudinally extending grooves defined by cell walls on the outer peripheral surface of the ceramic honeycomb body with a coating material comprising 100 parts by mass of ceramic particles and 2-30 parts by mass of colloidal silica having an average particle size of 4-60 nm, and then drying it with hot air at 100-500° C.

DESCRIPTION OF THE PREFERRED EMBODIMENTS

[1] Honeycomb Structure

The ceramic honeycomb structure of the present invention comprises a ceramic honeycomb body having cell walls defined by a large number of longitudinally extending cells, and an outer peripheral wall formed on an outer peripheral surface of the ceramic honeycomb body, the outer peripheral wall being formed by coating longitudinally extending grooves defined by cell walls on the outer peripheral surface of the ceramic honeycomb body with a coating material, and the outer peripheral wall having higher hardness in its outer peripheral portion than in its inside portion in a thickness direction. High hardness in the outer peripheral portion of the outer peripheral wall makes the ceramic honeycomb structure resistant to damage even when subjected to very large vibration or shock during use in construction machines, for instance, and relatively low hardness in the inside portion of the outer peripheral wall relaxes heat shock applied to the ceramic honeycomb structure because it acts as a cushion between the outer peripheral wall and the cell walls. Accordingly, the ceramic honeycomb structure has enough heat shock resistance when used for catalyst converters or ceramic honeycomb filters. Namely, the outer peripheral wall has enough hardness and heat shock resistance.

Figure 1A:
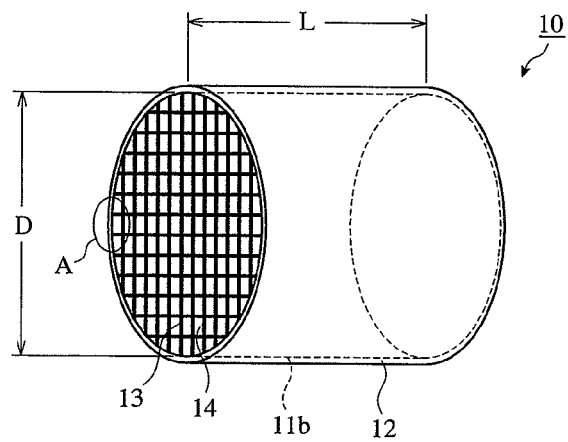
FIG. 1(a) is a cross-sectional view showing one example of the ceramic honeycomb structures of the present invention.
Figure 1B:
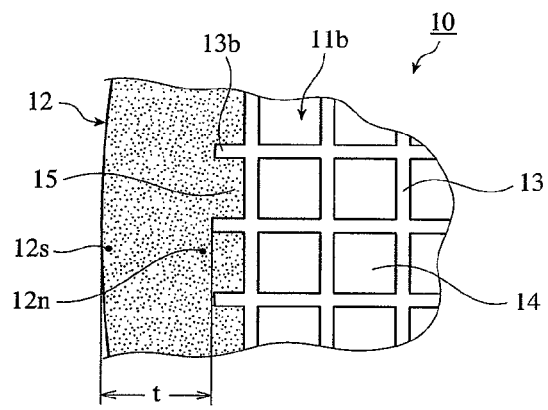
FIG. 1(b) is an enlarged cross-sectional view showing a portion A in FIG. 1(a).
Figure 2:
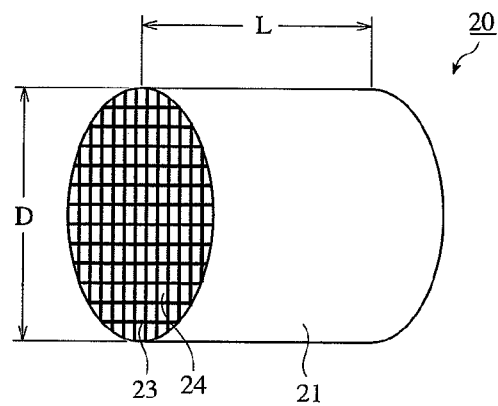
FIG. 2 is a cross-sectional view showing one example of a conventional ceramic honeycomb structure.

The outer peripheral portion 12s is a portion of the outer peripheral wall 12 near its outer surface as shown in FIG. 1(b), and the inside portion 12n is a portion of the outer peripheral wall 12 near grooves defined by the outermost cell walls 13b of the ceramic honeycomb body 11b in a thickness direction.

The B-type durometer hardness (ASTM D2240) of the outer peripheral wall is preferably 90-95 in the outer peripheral portion, and 85-90 in the inside portion. When the hardness of the outer peripheral portion is less than 90, the outer peripheral wall is damaged by very large vibration or shock, and when it is more than 95, the outer peripheral wall has too low heat shock resistance. When the hardness of the inside portion is less than 85, the outer peripheral wall is damaged by very large vibration or shock, and when it is more than 90, the inside portion does not act as a cushion between the outer peripheral wall and the cell walls, resulting in low heat shock resistance. The hardness of the outer peripheral wall preferably decreases gradually from the outer peripheral portion to the inside portion. Such structure can well prevent damage due to very large vibration or shock, further increasing heat shock resistance.

The outer peripheral wall preferably is as thick as 0.5-5 mm. With less than 0.5 mm thickness, the outer peripheral wall is easily damaged, failing to have sufficient strength. When the outer peripheral wall is thicker than 5 mm, colloidal silica does not easily move outward during drying the outer peripheral wall, there is small hardness difference between the outer peripheral portion and the inside portion. Accordingly, the inside portion does not easily act as a cushion between the outer peripheral wall and the cell walls when subjected to heat shock, resulting in less relaxation of the heat shock and thus poor heat shock resistance.

[2] Production method

The outer peripheral wall in the ceramic honeycomb structure of the present invention is formed by coating longitudinally extending grooves defined by cell walls on an outer peripheral surface of the ceramic honeycomb body with a coating material comprising 100 parts by mass of ceramic particles and 2-30 parts by mass of colloidal silica having an average particle size of 4-60 nm, and then drying it with hot air at 100-500° C. By using colloidal silica having an average particle size of 4-60 nm, water moves from the inside portion to the outer peripheral portion during drying the outer peripheral wall, and the migration of water is accompanied by the migration of colloidal silica outward in the outer peripheral wall. As a result, colloidal silica is concentrated in the outer peripheral portion of the outer peripheral wall, so that the outer peripheral portion is stronger than the inside portion.

When the average particle size of the colloidal silica is less than 4 nm, there is too much bonding strength between the colloidal silica and the ceramic particles, resulting in high hardness up to the inside portion in the dried or sintered outer peripheral wall. As a result, the inside portion does not act as a cushion between the outer peripheral wall and the cell walls, resulting in insufficient heat shock resistance. When the average particle size of the colloidal silica is more than 60 nm, there is too small bonding strength between the colloidal silica and the ceramic particles, providing the dried or sintered outer peripheral wall with insufficient hardness, so that the outer peripheral wall is easily damaged by very large vibration or shock. The average particle size of the colloidal silica is more preferably 10-40 nm. When more than 30 parts by mass of colloidal silica is contained per 100 parts by mass of ceramic particles, the dried or sintered outer peripheral wall has high hardness up to the inside portion. As a result, the inside portion does not easily act as a cushion between the outer peripheral wall and the cell walls, resulting in insufficient heat shock resistance. When the colloidal silica is less than 2 parts by mass per the ceramic particles, the dried or sintered outer peripheral wall has such insufficient hardness that it is damaged by very large vibration or shock. The amount of the colloidal silica is more preferably 5-25 parts by mass per 100 parts by mass of the ceramic particles.

The applied coating material is preferably dried with hot air at 100-500° C. When the drying temperature is lower than 100° C., the migration of the colloidal silica is insufficient, resulting in insufficient concentration of the colloidal silica in the outer peripheral portion of the outer peripheral wall. When the drying temperature is higher than 500° C., cracking easy occurs by drying. The hot-air drying temperature is more preferably 120-400° C.

After coating, only colloidal silica having an average particle size of 4-60 nm may be applied to the outer peripheral wall to increase the strength and heat shock resistance of the outer peripheral wall.

The ceramic particles contained in the coating material may be cordierite, alumina, mullite, silica, aluminum titanate, silicon carbide, etc., and amorphous silica is preferably preferable. Amorphous silica having higher hardness than that of the other ceramic particles can provide the outer peripheral wall with higher hardness.

The coating material is kneaded preferably under reduced pressure of −80 kPa or less to release air from the coating material, thereby increasing the hardness of the outer peripheral wall. The pressure is more preferably −90 kPa or less.

The present invention will be explained in more detail referring to Examples below without intention of restricting the scope of the present invention.

EXAMPLE 1

Kaolin powder, talc powder, silica powder and alumina powder were mixed to prepare cordierite-forming material powder comprising 50% by mass of $SiO_2$, 35% by mass of $Al_2O_3$ and 13% by mass of MgO. This powder was mixed with methylcellulose and hydroxypropyl methylcellulose as binders, a lubricant, and graphite as a pore former. After thorough dry-blending, water was added to carry out sufficient kneading to prepare a moldable ceramic material.

This moldable material was extrusion-molded, and cut to a predetermined length to obtain a honeycomb molding integrally having a peripheral wall portion and cell walls. This molding was dried and sintered to obtain a sintered cordierite honeycomb having an outer diameter D of 280 mm, a length L of 300 mm, a cell wall thickness of 0.3 mm and a cell pitch of 1.5 mm as shown in FIG. 1. Using a cylindrical grinding machine, the outermost cell walls 13 were removed from this sintered honeycomb to provide a ceramic honeycomb body 11b with longitudinally extending grooves 15. Cordierite was mixed with 20% by mass of colloidal silica having an average particle size of 4 nm, an organic binder and water, and blended at atmospheric pressure to prepare a coating agent paste applicable to the sintered honeycomb. This coating agent was applied to the grooves 15 of the ceramic honeycomb body 11b to a thickness of about 1.5 mm to form an outer peripheral wall, and dried at 150° C. for 10 minutes to produce a ceramic honeycomb structure 10 having an outer diameter of 266.7 mm and a length of 300 mm.

EXAMPLES 2-11, CONVENTIONAL EXAMPLES 1 AND 2, AND COMPARATIVE EXAMPLES 1 AND 2

Ceramic honeycomb structures were produced in the same manner as in Example 1, except for changing the type of ceramic particles in the coating agent for forming an outer peripheral wall, the average particle size and amount of colloidal silica in the coating agent, blending pressure and drying conditions as shown in Table 1. Conventional Example 1 used the coating material described in JP 2004-75524 A, and Conventional Example 2 formed a dense surface layer using the coating material described in JP 2006-255542 A.

TABLE 1

| | | Colloidal Silica | | | |
|---|---|---|---|---|---|
| No. | Coated Ceramic Particles | Average Particle Size (nm) | Amount[1] (%) | Blending Pressure[2] (kPa) | Drying Conditions |
| Example 1 | Cordierite | 4 | 20 | Atmospheric Pressure | 150° C., and 10 minutes |
| Example 2 | Cordierite | 4 | 20 | −80 | 150° C., and 10 minutes |
| Example 3 | Cordierite | 10 | 20 | −80 | 150° C., and 10 minutes |
| Example 4 | Cordierite | 25 | 20 | −80 | 150° C., and 10 minutes |
| Example 5 | Cordierite | 30 | 20 | −80 | 150° C., and 10 minutes |
| Example 6 | Cordierite | 50 | 20 | −80 | 150° C., and 10 minutes |
| Example 7 | Cordierite | 60 | 20 | −80 | 150° C., and 10 minutes |
| Example 8 | Amorphous Silica | 4 | 2 | −80 | 150° C., and 10 minutes |
| Example 9 | Amorphous | 20 | 20 | −80 | 150° C., and 10 |

TABLE 1-continued

| No. | Coated Ceramic Particles | Colloidal Silica Average Particle Size (nm) | Amount[1] (%) | Blending Pressure[2] (kPa) | Drying Conditions |
|---|---|---|---|---|---|
| | Silica | | | | minutes |
| Example 10 | Amorphous Silica | 40 | 25 | −80 | 150° C., and 10 minutes |
| Example 11 | Amorphous Silica | 60 | 30 | −80 | 150° C., and 10 minutes |
| Conventional Example 1 | Cordierite | 20 | 20 | Atmospheric Pressure | 90° C., and 2 hours |
| Conventional Example 2 | Cordierite | 20 | 20 | Atmospheric Pressure | 110° C., and 10 minutes |
| Comparative Example 1 | Amorphous Silica | 3 | 1 | Atmospheric Pressure | 90° C., and 10 minutes |
| Comparative Example 2 | Amorphous Silica | 70 | 50 | −80 | 150° C., and 10 minutes |

Note:
[1]Amount (% by mass) per the ceramic particles in the coating agent.
[2]Difference from the atmospheric pressure, minus meaning reduced pressure.

With respect to the resultant honeycomb structures, the measurement of hardness and isostatic strength, and the evaluation of heat shock resistance were conducted by the flowing methods. The results are shown in Table 2.

Measurement of Hardness

The hardness of the outer peripheral wall 12 of the honeycomb structure 10 was measured by a B-type durometer according to ASTM D2240. Using ASKER Durometer Type B available from Kobunshi Keiki Co., Ltd., two points in the outer peripheral wall 12 in a thickness direction, an outer peripheral portion 12s and an inside portion 12n, were measured. The hardness of the outer peripheral portion 12s was measured by pushing an indenter onto the outer peripheral wall 12, and the hardness of the inside portion 12n was measured by pushing an indenter onto a surface exposed by cutting the outer peripheral wall to a position of the inside portion 12n (substantially at depth t).

Isostatic Strength Test

The isostatic strength was measured according to the automobile standard (JASO) M505-87 of the Society of Automotive Engineers of Japan, Inc. With both longitudinal ends sealed with 20-mm-thick aluminum plates and an outer peripheral surface sealed with a 2-mm-thick rubber, the ceramic honeycomb structure was placed in a pressure container, into which water was introduced to add isostatic pressure to the outer peripheral wall surface. The pressure at which the ceramic honeycomb structure was broken was measured, and used as isostatic strength. The isostatic strength was evaluated according to the following standard.

Excellent: Not damaged even at pressure of 2 MPa (having sufficiently strength),
Good: Not damaged even at pressure of 1.5 MPa (durable in actual use), and
Poor: Damaged at pressure of less than 1.5 MPa (not durable in actual use).

Evaluation of Heat Shock Resistance

The heat shock resistance was evaluated by heating the honeycomb structure 10 at 500° C. for 30 minutes in an electric furnace, and then rapidly cooling it to room temperature to observe cracking by the naked eye. When cracking was not observed, the same test was repeated until cracking occurred, with the temperature of the electric furnace elevated by 25° C. each. Three samples in each Example and Comparative Example were evaluated, and the difference between the temperature at which at least one honeycomb structure was cracked and room temperature (heating temperature–room temperature) was used as a heat shock resistance temperature, and evaluated according to the following standard.

Excellent: The heat shock resistance temperature was 600° C. or higher,
Good: The heat shock resistance temperature was lower than 600° C. and 550° C. or higher,
Poor: The heat shock resistance temperature was lower than 550° C.

TABLE 2

| | Hardness | | Evaluation | |
|---|---|---|---|---|
| No. | Outer Peripheral Portion | Inside Portion | Isostatic Strength | Heat Shock Resistance |
| Example 1 | 96 | 89 | Excellent | Good |
| Example 2 | 99 | 92 | Excellent | Good |
| Example 3 | 95 | 90 | Excellent | Excellent |
| Example 4 | 93 | 87 | Excellent | Excellent |
| Example 5 | 92 | 87 | Excellent | Excellent |
| Example 6 | 91 | 85 | Good | Good |
| Example 7 | 90 | 85 | Good | Good |
| Example 8 | 95 | 90 | Excellent | Excellent |
| Example 9 | 93 | 88 | Excellent | Excellent |
| Example 10 | 91 | 87 | Excellent | Excellent |
| Example 11 | 90 | 86 | Excellent | Excellent |
| Conventional Example 1 | 85 | 85 | Poor | Good |
| Conventional Example 2 | 100 | 100 | Excellent | Poor |
| Comparative Example 1 | 99 | 99 | Excellent | Poor |
| Comparative Example 2 | 87 | 87 | Good | Poor |

It is clear from Table 2 that the honeycomb structures of Examples 1-11 had higher hardness in the outer peripheral portion 12s than in the inside portion 12n in the outer peripheral wall 12 in the direction of thickness t, so that they exhibited excellent heat shock resistance despite high hardness in the outer peripheral wall. Among them, the ceramic honeycomb structures of Examples 8-11 using amorphous silica as ceramic particles and having outer surfaces formed by a coating material containing 2-30% by mass of colloidal silica having an average particle size of 4-60 nm had excellent hardness and heat shock resistance in the outer peripheral walls. The honeycomb structures 10 of Comparative Examples 1 and 2 and Conventional Examples 1 and 2 had poor strength or heat shock resistance in the outer peripheral walls 12.

EFFECT OF THE INVENTION

The ceramic honeycomb structure of the present invention having an outer peripheral wall with higher hardness in the outer peripheral portion than in the inside portion is particularly suitable for large ceramic honeycomb filters, because the outer peripheral wall has such high hardness and heat shock resistance that it is not damaged even under very large vibration or shock.

The method of the present invention can easily produce the above ceramic honeycomb structure having high hardness and heat shock resistance, at low cost.

What is claimed is:

1. A ceramic honeycomb structure, comprising:
    a ceramic honeycomb body having cell walls defining longitudinally extending cells, and
    an outer peripheral wall formed on the outer peripheral surface of said ceramic honeycomb body, said outer peripheral wall being formed by coating longitudinally extending grooves defined by cell walls on the outer peripheral surface of the ceramic honeycomb body with a coating material comprising colloidal silica having an average particle size of 10-40 nm and ceramic particles selected from the group consisting of cordierite and amorphous silica, and said outer peripheral wall having a thickness of 1.5-5 mm and having higher hardness in its outer peripheral portion than in its inside portion in a thickness direction, wherein the B-type durometer hardness (ASTM D2240) of said outer peripheral wall is 90-95 in said outer peripheral portion, and 85-90 in said inside portion,
    wherein the isostatic strength and the heat shock resistant temperature of said ceramic honeycomb structure are 2 MPa or more and 600° C. or higher, respectively, and wherein said outer peripheral wall is formed by drying it with hot air at 150-400° C.

2. The ceramic honeycomb structure according to claim 1, wherein said outer peripheral wall has hardness gradually decreasing from said outer peripheral portion to said inside portion.

3. A method for producing a ceramic honeycomb structure according to claim 1, comprising:
    forming said outer peripheral wall having a thickness 1.5-5 mm by coating longitudinally extending grooves defined by cell walls on the outer peripheral surface of the ceramic honeycomb body with a coating material comprising 100 parts by mass of ceramic particles and 2-30 parts by mass of colloidal silica, and then drying it with hot air at 150-400° C.,
    wherein said colloidal silica has an average particle size of 10-40 nm, and said ceramic particles are selected from the group consisting of cordierite and amorphous silica, and wherein said coating material is kneaded under reduced pressure of −80 kPa or less.

* * * * *